EJECTOR DEVICE

INVENTORS
DANIEL J. MESCE
REYNOLD H. ASTROVE
BY Herbert L. Davis
ATTORNEY

INVENTORS
DANIEL J. MESCE
REYNOLD H. ASTROVE
BY Herbert L. Davis
ATTORNEY

EJECTOR DEVICE

Filed Feb. 8, 1968 3 Sheets-Sheet 3

INVENTORS
DANIEL J. MESCE
REYNOLD H. ASTROVE
BY Herbert L. Davis
ATTORNEY

United States Patent Office 3,526,029
Patented Sept. 1, 1970

3,526,029

EJECTOR DEVICE

Daniel J. Mesce, Nutley, and Reynold H. Astrove, Harrington Park, N.J., assignors to The Bendix Corporation, a corporation of Delaware Filed Feb. 8, 1968, Ser. No. 704,049
Int. Cl. H05k *13/00*
U.S. Cl. 29—203 16 Claims

ABSTRACT OF THE DISCLOSURE

An ejector device to assemble and locate polarizing tabs with extreme accuracy in an electrical connector by the provision of means to force selected contact spring elements of the electrical connector apart so as to permit a polarizing tab to be ejected with extreme accuracy into a position on selected rib portions adjacent to and separating pairs of the contact spring elements at opposite sides of the connector so as to condition the electrical connector for the acceptance or rejection of electrical printed circuit cards applied to the electrical connector, the cards having indexing slots arranged in a predetermined relation to the polarizing tabs so as to assure that a proper circuit card and the correct electrical connection thereof is effected at a preselected electrical connector.

BACKGROUND OF THE INVENTION

Field of the invention

This invention resides in part in a recognition of a problem heretofore encountered in electrical connectors of the so-called edge type wherein a plurality of contact spring elements are secured within a common insulating block member so as to define contact faces adapted to receive and interconnect a number of parallel conductive paths mounted on the surface of a printed circuit card or insulating panel and in the provision of a novel idea of means for effecting a solution of the problem presented in the assembly of indexing means in such type connectors.

These type electrical connectors have found general use in complex computer networks in which the electrical connectors may be fastened and wired into large box type containers including thousands of such electrical connectors with the attendant printed circuit cards. Each of the electrical connectors is arranged to accept a proper printed circuit card, in that each card has an indexing slot so positioned in relation to a polarizing or indexing tab of a corresponding electrical connector in which the card has been designed to operate, that the indexing slot in such card will freely accept the polarizing tab of such electrical connector and thereby assure the correct electrical connection of the card in the electrical connector while the polarizing tab serves to reject all other circuit cards not specifically designed to operate in the proposed electrical connector.

Such polarizing tabs have raised problems particularly in the assembly thereof in the electrical connectors in such a manner as not to impair the intended operation thereof.

Description of the prior art

Heretofore the only way to insert the tabs into such edge type electrical connectors was to push the tabs on to opposite ribs adjacent spring contact elements of the connectors with a tweezer and force fit them on with a rod. This was a time consuming and tedious procedure and in such a tweezer fitting of the tabs a great number of the tabs would be cocked and damaged.

In the present invention to assure the proper insertion of each indexing tab, the ejector device is so arranged as to bias selected spring contact elements apart so as to permit a tab to be thereafter ejected into a position on opposite ribs separating adjacent spring contact elements in an electrical connector of the so-called edge type such as disclosed in a U.S. Pat. No. 3,273,109, granted Sept. 13, 1966, to Norbert L. Moulin.

A U.S. Pat. No. 3,307,244, granted Mar. 7, 1967, to George T. DeShong discloses an ejector mechanism and method of applying terminal pins to printed circuit boards while a U.S. Pat. No. 1,944,683 granted Jan. 23, 1944, to Frederick W. Doyle discloses guiding pins for a contact assembly and U.S. Pat. No. 3,251,125 granted May 17, 1966, to Robert J. Kinkaid et al. discloses a tool for a tab terminal connector means which permits rapid terminal withdrawal without contact damage.

The aforenoted patents fail to show a true recognition of the problem to which the present invention is directed. Thus a person having the disclosures of the patents before him, who was not cognizant of the present invention, would not be informed that the problem solved by the present invention even existed.

There is no suggestion in the prior art of the desirability of associating the several elements of the ejector device in the manner disclosed in the present invention for the purposes specified, much less any suggestion as to how such association could be made if it were considered desirable.

SUMMARY OF THE INVENTION

A feature of the subject ejector device includes the provision of means to bias opposite pairs of preselected spring contact elements of an electrical connector apart while permitting a polarizing or indexing tab to be ejected into a position on rib portions adjacent to and separating the pairs of the spring contact elements at opposite sides of the electrical connector.

A further novel feature of the invention includes the provision of a means for effectively positioning an ejector mechanism or plurality of such ejector mechanisms in cooperative relation with an edge type electrical connector so as to eject such tabs into accurate predetermined positions in relation to the spring contact elements of the electrical connector and indexing slots of a printed circuit card for acceptance or rejection of the card by the polarizing tabs.

The present invention resides in a concept which simplifies the ejection of indexing or polarizing tabs into such edge type electrical connectors, reduces the time expended and avoids the tedious procedure incident to the prior tweezer fitting of the indexing tabs while at the same time raising the percent of accuracy and certaintly in the positioning of the indexing tabs in the electrical connector so as to effect a condition which is more sure to produce the desired result not only with greater certainty, but with a less expenditure of time and money than the prior methods and devices.

Therefore, an object of the present invention is to provide an ejector device which will accurately assemble and locate polarizing tabs in a so-called edge type electrical connector such as disclosed in the U.S. Pat. No. 3,273,109 and in proper sequence pursuant to predetermined requirements.

Another object of the invention is to provide an ejector device including means to bias preselected spring contact elements apart and thereafter permit a polarizing or indexing tab to be ejected into a position on opposite rib portions adjacent the thus biased preselected spring contact elements so as to provide an easy, effective and fast transfer of the tabs into the connector in predetermined positions.

Another object of the invention is to provide novel means for effectively positioning an ejector mechanism or a plurality of such ejector mechanisms in cooperative relation with spring contact elements of an electrical connector of the so-called edge type so as to eject such tabs onto ribs of the connector in an accurate predetermined position relative to the spring contact elements of the electrical connector and performed index slots of a printed circuit card for acceptance or rejection of the card by the polarizing tabs.

Another object of the invention is to provide novel means for effecting an easy and fast transfer of polarizing tabs into the so-called edge type electrical connector.

Another object of the invention is to provide novel means for ejecting polarizing tabs into an edge type electrical connector so as to be positioned in a square and parallel relation on the ribs separating adjacent spring contact elements of the edge type connector so as to assure good contact between terminals of the printed circuit card with the spring contact elements provided in the electircal connector.

Another object of the invention is to provide an ejector device for effecting the ejection of the indexing or polarizing tabs into an edge type electrical connector so as to reduce the time extended and effect a material increase in the rate of insertion of such polarizing tabs into a multiple spring contact electrical connector.

Another object of the invention is to provide an ejector device for inserting polarizing tabs into an edge type electrical conductor with greater accuracy so as to avoid the necessity of rework and rejections which may be costly.

These and other objects and features of the invention are pointed out in the following description in terms of the embodiment thereof, which is shown in the accompanying drawings. It is to be understood, however, that the drawings are for the purpose of illustration only and are not a definition of the limits of the invention, reference being had to the appended claims for this purpose.

DESCRIPTION OF THE DRAWINGS

In the drawings, in which corresponding numerals indicate corresponding parts.

DESCRIPTION OF THE PREFERRED EMBODIMENT

Figure 1:
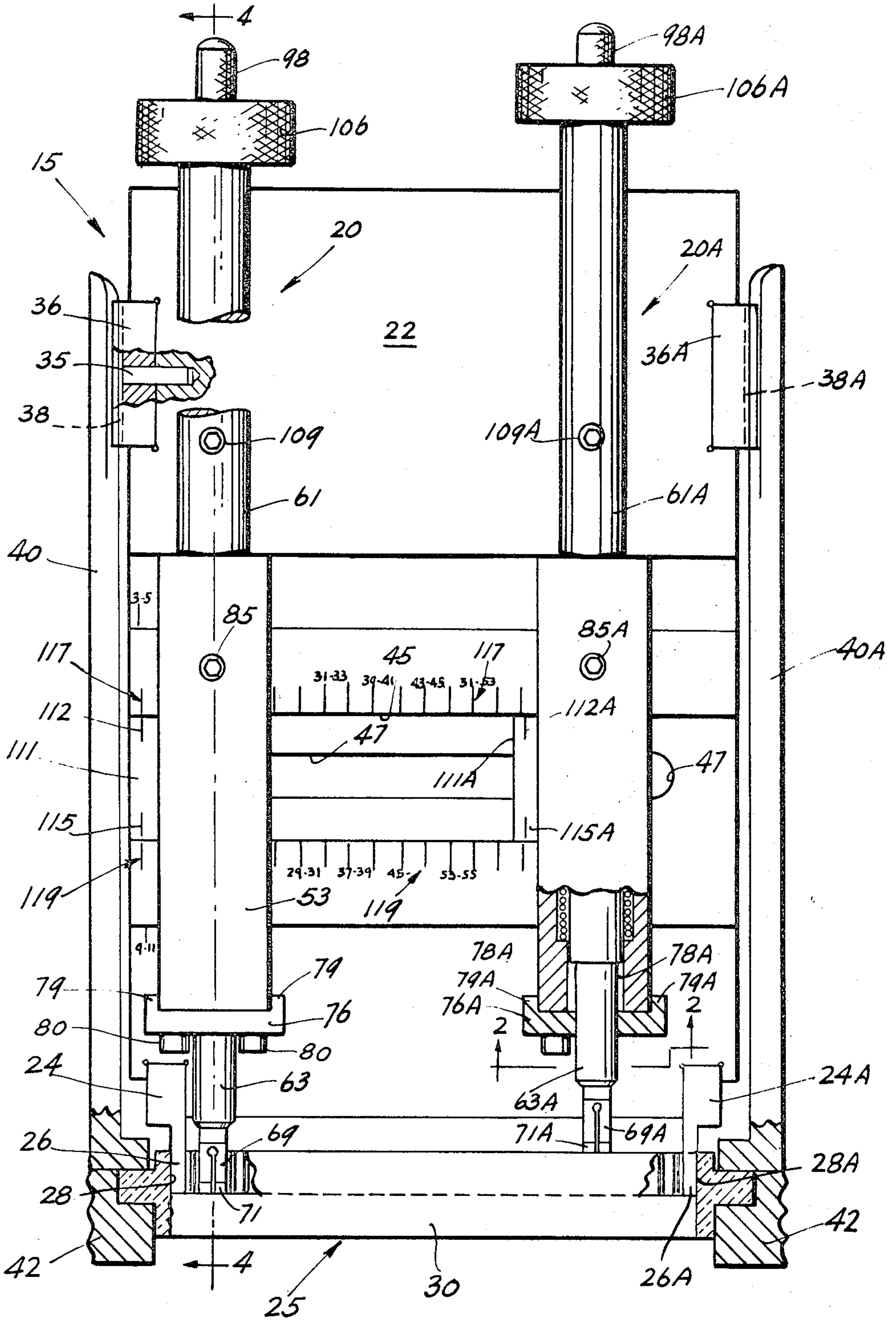
FIG. 1 is an enlarged side view of an ejector device embodying the invention and illustrating one of a plurality of ejector mechanisms of the device in an operative relation to an edge type electrical connector while another of the ejector mechanisms is shown in an inoperative relation to the electrical connector with end portions of the connector broken away so as to better illustrate the ejector device in relation thereto.
Figure 2:
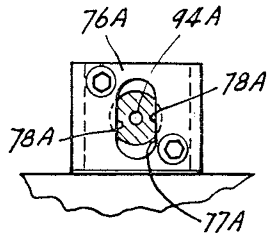
FIG. 2 is an end sectional view of one of the ejector mechanisms taken along the lines 2—2 of FIG. 1 and looking in the direction of the arrows.

Referring to the drawing of FIG. 1, the ejector device indicated generally by a numeral 15 includes a plurality of ejector mechanisms 20 and 20A carried by a main base plate 22 supported by two lugs or feet 24 and 24A having pins 26 and 26A, respectively, slidably positioned in suitable slots 28 and 28A formed at opposite ends in a common insulating block member 30 of a conventional edge type electrical connector 25. The electrical connector 25 has a plurality of opposite spring contact elements indicated generally in FIGS. 11, 12 and 14 by the numerals 31 and 32 and which are shown as of a type such as shown and described in the U.S. Pat. No. 3,273,109.

Figure 3:
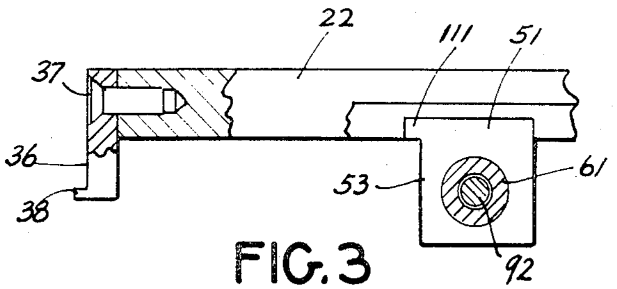
FIG. 3 is a top fragmentary edge view of the base plate of the ejector device illustrating one of a pair of footed elements for slidably mounting the base plate of the ejector device on suitable tracks provided in a receptacle and with certain parts broken away so as to better illustrate a laterally extending slot in the base plate in which an adjustable indicia block of one of the injector mechanisms is shown slidably mounted.
Figures 10, 11, 12, 13, 14:
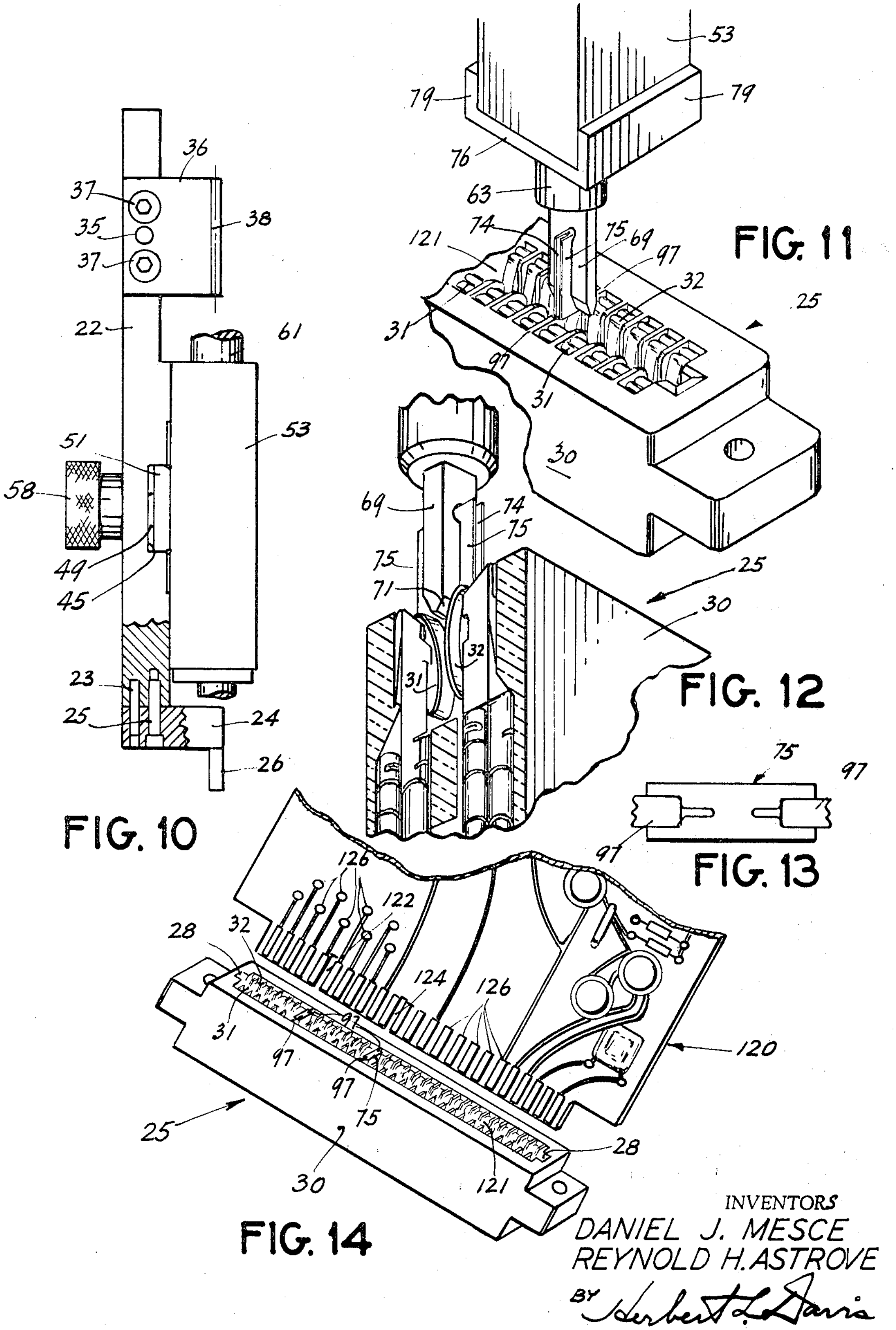
FIG. 10 is a side view of one of the ejector mechanisms of FIG. 1 with parts broken away so as to show the operative relation thereof in the laterally extending adjustment slot of the base plate of FIG. 1.
FIG. 11 is an enlarged fragmentary exploded perspective view of a portion of the electrical connector with the blade portion of the ejector mechanism of FIG. 1 carrying a polarizing tab for ejection into an operative position on opposite rib portions separating selected pairs of spring contact elements of the electrical connector.
FIG. 12 is an enlarged fragmentary exploded perspective view of a portion of the electrical connector with the blade portion of the ejector mechanism in a position preparatory to biasing contact spring elements at opposite sides of the connector apart as the blade portion is forced into the electrical connector by the operator immediately prior to the ejection of the polarizing tab onto the selected rib portions of the connector.
FIG. 13 is a greatly enlarged fragmentary top view of an end of the polarizing tab of FIGS. 11 and 12 after the ejection thereof into an operative relation on opposite selected rib portions of the electrical connector and showing the split edge portions of the tab embracing opposite edges of the selected rib portions.
FIG. 14 is a fragmentary perspective view illustrating the indexing tabs in the edge type electrical connector in an operative relation to indexing slots provided in a typical printed circuit card or panel.

The base plate 22 further has footed elements 36 and 36A secured at opposite side edges thereof by an accurate positioning pin 35 and fastening bolts 37, as shown in FIGS. 1, 3 and 10. Each footed element 36 and 36A has a flanged portion 38 and 38A projecting at a right angle from the outer edge thereof, as best shown in FIGS. 1, 3 and 10, and arranged to slidably mount the base plate 22 in suitable tracks 40 and 40A, as shown by FIG. 1, which may be secured in a receptacle such as a box indicated by the numeral 42 and in which there may be slidably mounted a multiplicity of corresponding edge type electrical connectors 25 for receiving printed circuit cards or boards of a type such as shown, for example, by FIG. 14.

Further provided in the base plate 22 is a groove 45 extending across the base plate 22 and having formed therein a parallel slot 47 for receiving a stem 49 secured at one end in a raised portion 51 of an adjustable block 53 of one of the ejector mechanisms, while the opposite end of the stem 49 is externally screw threaded at 55 for screw threaded engagement with internal screw threads 56 of a fastening nut 57 having a knurled adjustment head 58. The fastening nut 57 may be adjusted on the stem 49 for securing the ejector mechanism in an adjusted position on the base plate 22, as will be explained hereinafter in greater detail.

The block 53 includes an actuating rod 61 slidably mounted therein. An extension rod 63 is attached at one end of the actuating rod 61 by internal locking members 65, as shown in FIGS. 4 and 5, positioned in locking relation between an end portion 64 of the extension rod 63 and an internal surface of a recess 66 provided in an adjacent end of the actuating rod 61.

Figure 4:
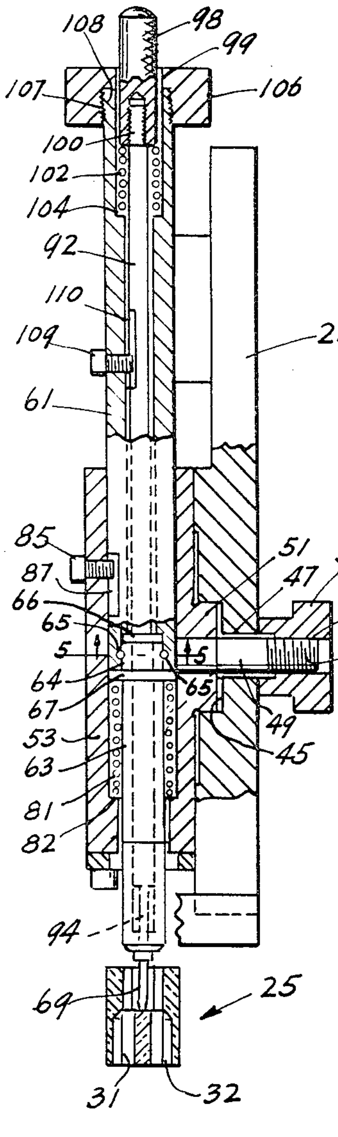
FIG. 4 is a longitudinal sectional view of one of the ejector mechanisms of FIG. 1 taken along the lines 4—4 thereof and looking in the direction of the arrows.
Figure 5:
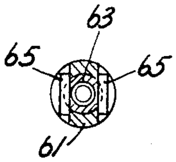
FIG. 5 is a fragmentary sectional view of the operating rods of one of the ejector mechanisms, taken along the lines 5—5 of FIG. 4 and looking in the direction of the arrows.
Figure 6:
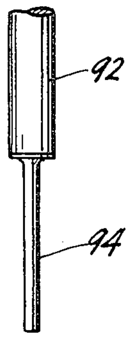
FIG. 6 is an enlarged fragmentary side view of the ejector needle of FIG. 4.
Figure 7:
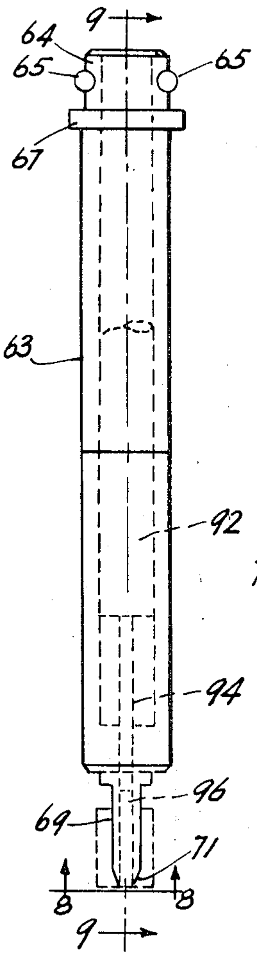
FIG. 7 is an enlarged longitudinal side view of the extension rod of FIG. 4 showing the detail structure of an end blade portion of the extension rod with a polarizing tab shown by dotted lines positioned in a retaining slot in the end blade portion.
Figure 8:
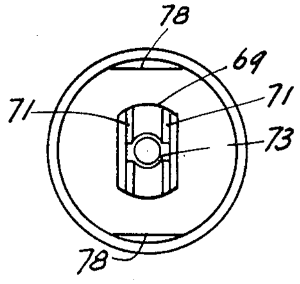
FIG. 8 is an enlarged end view of the extension rod taken along the lines 8—8 of FIG. 7 and looking in the direction of the arrows so as to show the detail structure of the end blade portion of the rod and showing the slot for retaining the polarizing tab therein with an end of the ejector needle shown in an operative relation thereto.
Figure 9:
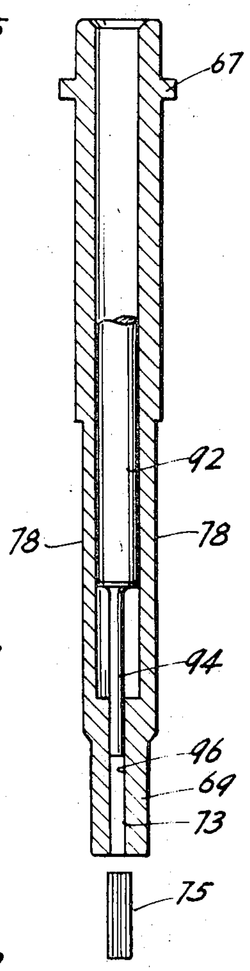
FIG. 9 is a sectional view of the extension rod of FIG. 7 taken along the lines 9—9 thereof and looking in the direction of the arrows and showing a fragmentary portion of the ejector needle in a slidable operative relation therein for ejecting from the blade portion of the extension rod a polarizing tab shown spaced apart from the end of the blade portion.

The extension rod 63 has a flange portion 65 adjacent one end thereof arranged to abut an end of the actuating rod 61 while at an opposite end of the extension rod 63 there is provided a bifurcated blade portion or wedging means 69, as shown in FIGS. 1, 8, 9, 11, and 12, having tapered end portions 71 for insertion between selected pairs of spring contact elements 31 and 32 at opposite sides of the edge type electrical connector, as shown in FIGS. 4, 11 and 12. The blade portion 69 has further provided therein a longitudinally extending slot 73 for receiving therein a polarizing tab 75 formed of a suitable plastic insulating material such as nylon having a rectangular shape with opposite resilient split edges 74, as shown in FIGS. 9, 11, 12 and 13 to receive therein edges of selected rib portions 97 of the electrical connector 25, as hereinafter explained.

The end portion of the actuating rod 63 adjacent the blade portion 69 is slidably mounted in a plate 76 having a slot 77 for receiving in slidable relation therein flat surfaces 78 extending along opposite sides of such end portion of the actuating rod 63, as shown by FIGS. 1, 2, 8 and 9. The plate 76 has flange portions 79 between which there is received the end portion of the block 53 adjacent such end portion of the actuating rod 63. Bolts 80 are screw threadedly engaged in the adjacent end of the block 53 so as to serve to secure the plate 76 thereto.

There is further provided a coil spring 81 having a lower end supported by an internal shoulder 82 provided in the vertical block 53, while an upper end of the coil spring 81 bears upon the flange portion 67 of the extension rod 63 so as to bias the extension rod 63 and the actuating rod 61 in the block 53 in such a sense that the blade portion 69 of the extension rod 63 is biased by the coil spring 81 toward the block 53, as limited by a suitable bolt 85 screw threadedly engaged in the block 53 and extending into a longitudinal slot 87 provided in the actuating rod 61.

Further slidably mounted in the actuating rod 61 and the extension rod 63 is an actuator rod 92 having an ejector needle 94 slidably mounted in a channel 96 formed in the blade portion 69 and opening into the slot 73 so that upon the actuator rod 92 being suitable actuated by the operator, the ejector needle 94 may force the polarizing tab 75 from the slot 73, in which the tab 75 has been retained, into a desirable position in which the opposite resilient split edges 74 of the tab 75 may embrace opposite edges of selected rib elements 97 provided in the edge type electrical connector 25 between selected pairs of the contact spring elements 31 and contact spring elements 32, as shown by FIGS. 11 and 14.

The needle actuator rod 92 has secured at an opposite free end thereof an operator-operative plunger 98 having an internal threaded portion 99 screw threadedly engaged on a free end portion 100 of the ejector rod 92. A coil spring 102 has one end thereof bearing upon an internal shoulder 104 provided in the actuating rod 61 while the opposite end of the coil spring 102 bears upon an end portion of the plunger 98 so as to in effect bias the ejector actuating rod 92 and thereby the ejector needle 94 inwardly in relation to the extension rod 63.

Further, there is provided an operator-operative knurled plunger or actuating element 106 having an internal portion 107 screw threadedly engaged on a screw threaded portion 108 of the actuating rod 61. The ejector actuating plunger 98 is arranged in slidable relation to the actuating rod 61 and actuating element 106. Inward movement of the ejector actuating rod 92 relative to the actuating rod 61 in opposition to the biasing force of the spring 102 is limited by a bolt 109 screw threadedly engaged in the actuating rod 61 and projecting into a longitudinal slot 110 provided in the ejector actuating rod 92, as shown in FIG. 4.

A lip 111 projects at a right angle from the portion 51 of the vertical block 53 and has formed thereon scribe lines 112 and 115 arranged to cooperate with suitable indicia 117 and 119, respectively, provided on the face of the base plate 22 adjacent opposite edges defining the channel 45 and correlated with corresponding indicia, not shown, provided on the electrical connector 25 indicative of rib portions 97 of the electrical connector 25 having a corresponding position in relation thereto.

Thus the block 53 may be adjustably positioned relative to the face of base plate 22 by the projecting portion 51 thereof being slidably positioned by the operator in the channel 45 so that the scribe lines 112 and 115 may coincide with the indicia 117 and 119. Thereafter, the block 53 may be set and fastened at the selected predetermined indicia by the operator securing the fastening nut 57. The ejector mechanism 20 is thereby adjustably set at a point to correspond with opposite preselected rib portions 97 indicated by corresponding indicia so as to be thereby conditioned for ejection of the tab 75 on to such selected rib portions 97, as shown by FIG. 14. The rib portions 97 may be identified on the electrical connector 25 by corresponding indicia to the indicia 117 and 119 to facilitate the selection of the desired rib portion 97.

As shown in FIG. 1, a pair of such ejector mechanisms are provided, as indicated by the numerals 20 and 20A. The ejector mechanism 20A is of an identical structure to that of the ejector mechanism 20 and corresponding parts have been indicated by like numerals with the suffix A applied thereto.

OPERATION

In the present invention, there are provided the manually operable ejector mechanisms 20 and 20A to assemble and locate the polarizing tabs 75 on the preselected rib portions 97 of the edge type electrical connectors 25 accurately and in proper sequence so as to meet the predetermined operating requirements of a printed circuit panel or board 120 to be inserted therein, as shown by FIG. 14.

The electrical connector 25, as heretofore explained, may be of a type such as shown and described in the U.S. Pat. No. 3,273,109 and may include, as shown by FIG. 14, a transverse chamber 121 having mounted therein a plurality of spring contact elements 31 and 32, one set of said spring contact elements 31 being positioned along one inner side surface of the transverse chamber 121 and another set of said spring contact elements 32 being positioned along an opposite inner side surface of the transverse chamber 121, as shown by FIG. 12, said electrical connector including rib portions 97 projecting from the one side surface of the transverse chamber for separating each of the spring contact elements 31 of said one set, and other rib portions 97 projecting from the opposite side surface of the transverse chamber 121 for separating each of the spring contact elements 32 of said other set, as shown by FIG. 11.

In a typical installation, the edge type electrical connector 25 may be fastened and wired in a large box type container in which there may be hundreds of the electrical connectors in each container of a type similar to the electrical connector 25. However, in such arrangement, each of the electrical connectors are arranged to accept a printed circuit card card 120 having predetermined operating characteristics. Each card 120 has provided an indexing slot 122 and 124 arranged in a different position so that when the circuit card 120 is properly positioned in a corresponding connector 25, the polarizing tabs 75, as shown by FIG. 14, are so arranged as to be accepted in the indexing slots 122 and 124 in the circuit card 120 so that electrical terminal elements 126 mounted at the edge of the circuit card 120 may make electrical contact with the proper spring contact elements 31 and 32 of the edge type electrical connector 25.

If an improper circuit card 120 is inserted, the tabs 75 will not be received in the indexing slot 122 or 124 and the printed circuit card will thereupon be rejected by the polarizing tabs 75 so that such improper printed circuit card or board 120 will not be permitted to enter the edge type electrical connector 25. Moreover, in such operation, it is essential that the polarizing tabs 75 be set in a square and parallel position on the rib portions 97 of the electrical connector 25 so as to properly accept or reject the applied card 120, and permit the electrical terminal elements 126 of an accepted circuit card to make electrical contact with the proper spring contact elements 31 and 32.

Previously, the only way to insert these polarizing tabs 75 into an edge type electrical connector such as indicated at 25 was to push them on to the rib portions 97 of the connectors 25 with a tweezer and force fit them on with a rod. This was a long and tedious procedure in which in the prior procedure a great number of the indexing tabs would be cut and damaged requiring reworking of the electrical connectors to prevent rejection thereof upon inspection.

In the operation of the ejector mechanisms 20 and 20A, the blocks 53 and 53A are set to a predetermined adjusted position by lining up the respective scribe line 112 or 115 and 112A or 115A on the flange portions 111 and 111A to the predetermined indicia lines 117 and 119 on the main base plate 22 indicative of selected rib portions 97 of the connector 25. The blocks 53 and 53A are thereupon secured in the predetermined adjusted position by fastening the respective locknuts 57 and 57A. The polarizing tabs 75 may then be inserted in the respective slots 73 and 73A of the blades 69 and 69A by hand, whereupon the base plate 22 may have the flange portions 38 and 38A of the footed elements 36 and 36A slidably positioned in the guide tracks 40 and 40A and the pins 26 and 26A slidably positioned and bottomed in the slots 28 and 28A provided at the opposite ends of the insulating block 30 of the electrical connector 25, as shown by FIG. 1.

Thereafter the operator first pushes the actuating rod 61 through the operating element 106 and against the biasing force of the spring 81 so as to cause the blade portion 69 to bias apart the spring contact elements 31 and 32 adjacent the selected rib portions 97, as shown by FIG. 12, and seat the tab 75 on the selected rib portions 97 of the electrical connector 25 clear of the selected pair of spring contact elements 31 and 32 separated by said selected rib portions 97, as shown by FIGS. 11 and 14.

Following the operation of the actuating rod 61, the operator pushes the plunger 98 inwardly against the biasing force of the spring 102 causing the rod 92 to slidably position the ejector needle 94 into the slot 73 and against the polarizing tab 75 retained therein.

The ejector needle 94 is thereupon conditioned to be effective to eject the tab 75 at that instant that the pressure on the actuating element 106 is released by the operator under the biasing force of the spring 81 so that the blade 69 is retracted from the electrical connector 25, while the tab 75 is ejected by the needle 94 from the blade 69 under the force applied by the operator to the plunger 98 leaving the tab 75 in a proper position on the preselected rib portions 97, as shown by FIG. 14. The respective actuating rods 61 and 92 of the respective ejector mechanisms 20 and 20A may be singularly or dually operated to provide the foregoing ejection operation of the respective polarizing tabs 75.

As will be readily seen from the foregoing, the ejection device 15, as thus operated, effects an easy and rapid transfer of the polarizing tabs 75 to the electrical connector 25 in such a manner that the tabs 75 will be positioned in a square and parallel relation on the selected rib portions 97 of the connector 25 assuring a good contact of the electrical terminals 126 of the printed circuit card 120 with the spring contact elements 31 and 32 of the connector 25 so that the labor rate of production may be increased tremendously with less rework and rejections and thereby avoid unnecessary expense and loss of time.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A device for applying a polarizing tab to an electrical connector said electrical connector being of a type including a transverse chamber a plurality of spring contact elements one set of said spring contact elements being positioned along one inner side surface of the transverse chamber and another set of said spring contact elements being positioned along an opposite inner side surface of the transverse chamber said electrical connector including rib portions projecting from the one side surface of said transverse chamber for separating the spring contact elements of said one set and other rib portions projecting from the opposite side surface of the transverse chamber for separating the spring contact elements of said other set; said device comprising a base member bifurcated means for carrying a polarizing tab, said bifurcated carrying means being slidably mounted on said base member, operator-operative means to slidably position the bifurcated carrying means relative to the base member for inserting the tab carrying bifurcated means between one selected rib portion projecting from the one side surface of said transverse chamber and another selected rib portion projecting from the opposite side surface of the transverse chamber so as to effectively position opposite side edges of the tab carried by the bifurcated means onto said selected rib portions separating a selected pair of the spring contact elements of said one set and a selected pair of the spring contact elements of said other set.

2. The device defined by claim 1 in which said operator-operative means includes first means operative in one sense for slidably inserting the tab carrying bifurcated means between the one selected rib portion projecting from the one side surface of said transverse chamber and the other selected rib portion projecting from the opposite side surface of said transverse chamber, said first means being operative in another sense to slidably withdraw the bifurcated means for carrying the tab from between said selected rib portions, and second ejector means operative to release the tab carried by the bifurcated carrying means so as to cause the tab to remain in a position on said selected rib portions upon the first means being operated in said other sense.

3. The device defined by claim 1 in which said tab carrying bifurcated means includes blade means to bias the selected pair of spring contact elements of the one set toward said one inner side surface of the transverse chamber and the selected pair of spring contact elements of the other set toward said opposite inner side surface of the transverse chamber upon the tab carrying bifurcated means being initially inserted bewteen the selected rib portions so that the opposite side edges of the tab may be positioned onto said selected rib portions clear of the selected pair of spring contact elements separated by said selected rib portions.

4. The device defined by claim 1 including other operator-operative means for adjustably positioning the bifurcated means for carrying the indexing tab longitudinally along the transverse chamber of the electrical connector for selecting the rib portions upon which the opposite side edges of the tab may be positioned upon insertion of the tab carrying bifurcated means between said selected rib portions.

5. The device defined by claim 2 in which said tab carrying bifurcated means includes blade means to bias the selected pair of spring contact elements of the one set towards said one inner side surface of a transverse chamber and the selected pair of spring contacting elements of the other set towards said opposite inner side surface of a transverse chamber upon the tab carrying bifurcated means being initially inserted between the selected rib portions so that the opposite side edges of the tab may be positioned in embracing relation onto said selected rib portions clear of the selected pair of spring contact elements separated by said selected rib portions.

6. A device for applying a polarizing tab to an electrical connector, said electrical connector being of a type including a transverse chamber, a plurality of spring contact elements, one set of said spring contact elements being positioned along one inner side surface of the transverse chamber and another set of said spring contact elements being positioned along an opposite inner side surface of the transverse chamber, said electrical connector including rib portions projecting from the one side surface of said transverse chamber for separating the spring contact elements of said one set, and other rib portions projecting from the opposite side surface of the transverse chamber for separating the spring contact elements of said other set; said device comprising means for carrying a polarizing tab, operator-operative means for inserting the tab carrying means between one selected rib portion projecting from the one side surface of said transverse chamber and another selected rib portion projecting from the opposite side surface of the transverse chamber to position opposite side edges of the tab onto said selected rib portions separating a selected pair of the spring contact elements of said one set and a selected pair of the spring contact elements of said other set, said operator-operative means including first means operative in one sense for inserting the means for carrying the tab between the one selected rib portion projecting from the one side surface of said transverse chamber and the other selected rib portion projecting from the opposite side surface of said transverse chamber, said first means being operative in another sense to withdraw the means for carrying the tab from between said selected rib portions, and second means operative to release the tab from the carrying means so as to cause the tab to remain in a position on said selected rib portions upon the first means being operated in said other sense said first means including a first actuating rod having a first operator-operative element at one end thereof, the means for carrying the polarizing tab including a blade portion mounted at an opposite end of the first actuating rod, the blade portion having a slot therein for carrying the tab, the first actuating rod being operative in said one sense by the first operator-operative element for inserting the blade portion between the selected rib portions so as to position the opposite side edges of the tab in an embracing relation onto said selected rib portions, first spring means for biasing the first actuating rod in another sense to withdraw the blade portion from between said selected rib portions, the second means including a second actuating rod slidably mounted in the first actuating rod and having a second operator-operative element at one end thereof and adjacent to said first operator-operative element, said second actuating rod including an ejector needle mounted at an opposite end of said second rod and arranged to be slidably positioned into the slot provided in said blade portion to eject the tab therefrom upon the first actuating rod being operated in said other sense, and second spring means operatively connected between the first actuating rod and the second actuating rod to bias the second actuating rod in a sense for removing the ejector needle from the slot in the blade portion of the first actuating rod.

7. The device defined by claim 6 in which said blade portion includes a bifurcated member defining the slot for carrying the tab, and the bifurcated member having side surfaces effective to bias the selected pair of spring contact elements of the one set towards said one inner side surface of the transverse chamber and the selected pair of spring contact elements of the other set towards said opposite inner side surface of the transverse chamber upon the bifurcated member of the blade portion being inserted between the selected rib portions so that the opposite side edges of the tab carried within the slot of the bifurcated member may be positioned in said embracing relation onto said selected rib portions clear of the selected pair of spring contact elements separated by said selected rib portions.

8. The device defined by claim 7 including a base plate, pin means carried by the base plate for releasably mounting the base plate in a predetermined relation to the transverse chamber of the electrical connector, the base plate having a groove formed therein and extending in parallel relation to the transverse chamber of the electrical connector, an adjustably positioned supporting block having a portion thereof slidably mounted in the groove, means for releasably securing the slidably mounted portion of the block in an adjusted position in the groove, said portion of the block including a lip having a scribe line provided thereon, indicia on the base plate along an edge defining the groove, the first actuating rod being slidably mounted in the block, the first spring means to bias said first actuating rod in said other sense being operatively connected between the block and the first actuating rod, and the indicia on the base plate being arranged in cooperative relation with the scribe line on the lip portion of the block so as to indicate an adjusted position of the bifurcated member in relation to the transverse chamber and the selected rib portions of the electrical connector corresponding to the adjusted position of the block.

9. An ejector device to assemble and locate a polarizing tab with extreme accuracy in an electrical connector, the ejector device comprising a base member, an operator-operative means including first means slidably mounted on the base member to carry the tab for selective insertion into the electrical connector, and said operator-operative means including second means operable to eject the polarizing tab carried by the first means onto selected rib portions of the connector adjacent to and separating pairs of contact spring elements of the connector so as to condition the electrical connector for acceptance and rejection of electrical circuit cards applied to the electrical connector, the cards being of a type having indexing slots therein arranged in a predetermined relation to the polarizing tab so as to assure that a proper circuit card and a correct electrical connection thereof by the contact spring elements may be effected at the electrical connector.

10. The ejector device defined by claim 9 including other operator-operative means to longitudinally position the slidably mounted ejector means on the base member and in relation to the rib portions of the connector so that the rib portions onto which the tab is to be ejected may be selected in a predetermined relation to the indexing slots provided in the circuit cards.

11. The ejector device defined by claim 9 in which the first means of the operator-operative means includes blade means effective to initially force apart contact spring elements of the electrical connector immediately adjacent to the selected rib portions so as to condition the electrical connector for reception of the tab, and the second means being effective to cause a subsequent ejection of the polarizing tab onto the selected rib portions following the initial conditioning of the electrical connector by the blade means.

12. The ejector device defined by claim 11 including other operator-operative means to longitudinally position the operator-operative ejector means on the base member and along a transverse chamber of the electrical connector and in relation to the rib portion of the connector projecting into said chamber adjacent to and separating pairs of the contact spring elements so that the rib portions onto which the tab is to be ejected may be selected in a predetermined relation to the indexing slots provided in the circuit cards.

13. An ejector device to assemble and locate polarizing tabs with extreme accuracy in an electrical connector device, the ejector device comprising a base member a plurality of operator-operative means including means to carry the tabs, the operator-operative means being slidably mounted on the base member and including other means selectively operable to eject the polarizing tabs carried by the first mentioned means onto selected rib portions of the connector adjacent to and separating pairs of contact spring elements of the connector so as to condition the electrical connector for acceptance and rejection of electrical circuit cards applied to the electrical connector, the cards being of a type having indexing slots therein arranged in a predetermined relation to the polarizing tabs so as to assure that a proper circuit card and a correct electrical connection thereof by the contact spring elements may be effected at the electrical connector.

14. The ejector device defined by claim 13 including other operator-operative means to adjustably position the plurality of slidably mounted ejector means on the base member along a transverse chamber of the electrical connector and in relation to the rib portions of the connector so that the rib portions onto which the tabs are to be ejected may be selected in a predetermined relation to the indexing slots provided in the circuit cards.

15. The ejector device defined by claim 13 in which each of the first mentioned tab carrying means of the operator-operative means includes wedging means, the wedging means being effective upon an initial insertion of the tab carrying means into the electrical connector to force apart contact spring elements of the electrical connector immediately adjacent to the selected rib portions so as to condition the electrical connector for a subsequent ejection of the polarizing tab onto the selected rib portions.

16. The ejector device defined by claim 15 including other operator-operative means to adjustably position each of the ejector means on the base member along a transverse chamber of the electrical connector and in relation to the rib portions of the connector projecting into said chamber adjacent to and separating pairs of the contact spring elements so that the rib portions onto which the tabs are to be ejected may be selected in a predetermined relation to the indexing slots provided in the circuit cards.

References Cited

UNITED STATES PATENTS

| | | | |
|---|---|---|---|
| 1,944,683 | 1/1934 | Doyle | 29—203 |
| 3,251,125 | 5/1966 | Kinkaid et al. | 29—203 |
| 3,307,244 | 3/1967 | De Shong | 29—203 |

THOMAS H. EAGER, Primary Examiner

PO-1050
(5/69)

UNITED STATES PATENT OFFICE
CERTIFICATE OF CORRECTION

Patent No. 3,526,029 Dated September 1, 1970

Inventor(s) Daniel J. Mesce and Reynold H. Astrove

It is certified that error appears in the above-identified patent and that said Letters Patent are hereby corrected as shown below:

Claim 1, column 8, line 20 after "connector" first occurrence insert a comma (,); line 21 after "chamber" insert a comma (,); line 22 after "elements" first occurrence insert a comma (,); line 26 after "chamber" insert a comma (,); line 29 after "set" insert a comma (,); line 33 after "member" insert a comma (,).

Claim 3, column 8, line 68 change "bewteen" to - - between - -.

Claim 6, column 9, line 54 after "sense" insert a comma (,).

Claim 12, column 11, line 7 change "portion" to - - portions - -.

SIGNED AND SEALED
NOV 10 1970

(SEAL)
Attest:

Edward M. Fletcher, Jr.
Attesting Officer

WILLIAM E. SCHUYLER, JR.
Commissioner of Patents